US010272772B2

(12) United States Patent
Compton (10) Patent No.: US 10,272,772 B2
(45) Date of Patent: Apr. 30, 2019

(54) MODULAR TRANSMISSION SUPPORT

(71) Applicant: Victor Products LLC, Prescott, AZ (US)

(72) Inventor: Lloyd Brooks Compton, Las Vegas, NV (US)

(73) Assignee: Victor Products LLC, Prescott, AZ (US)

( * ) Notice: Subject to any disclaimer, the term of this patent is extended or adjusted under 35 U.S.C. 154(b) by 0 days.

(21) Appl. No.: 15/809,978

(22) Filed: Nov. 10, 2017

(65) Prior Publication Data

US 2018/0079300 A1    Mar. 22, 2018

Related U.S. Application Data

(63) Continuation-in-part of application No. 14/861,357, filed on Sep. 22, 2015, now Pat. No. 9,816,599.

(60) Provisional application No. 62/055,449, filed on Sep. 25, 2014.

(51) Int. Cl.
| | | |
|---|---|---|
| B60K 17/00 | (2006.01) | |
| B60K 17/02 | (2006.01) | |
| B60K 5/12 | (2006.01) | |
| B62D 21/05 | (2006.01) | |
| B60K 5/02 | (2006.01) | |
| B62D 21/03 | (2006.01) | |
| F16H 57/025 | (2012.01) | |

(52) U.S. Cl.
CPC ............ B60K 17/02 (2013.01); B60K 5/02 (2013.01); B60K 5/1216 (2013.01); B60K 17/00 (2013.01); B62D 21/03 (2013.01); B62D 21/05 (2013.01); F16H 57/025 (2013.01)

(58) Field of Classification Search
CPC ..................................................... B62D 21/00
USPC ....... 248/637, 670, 671, 672, 674, 675, 678, 248/201, 214, 300, 316.8
See application file for complete search history.

(56) References Cited

U.S. PATENT DOCUMENTS

| | | | | |
|---|---|---|---|---|
| 5,823,287 A | * | 10/1998 | Chidamparam | B60K 17/00 180/377 |
| 6,408,974 B1 | * | 6/2002 | Viduya | B62D 21/00 180/312 |
| 6,564,892 B2 | * | 5/2003 | Wooldridge | B60K 5/12 180/300 |
| 8,636,303 B2 | * | 1/2014 | Gaussin | B62D 21/12 180/311 |
| 9,816,599 B2 | * | 11/2017 | Compton | B60K 17/00 |
| 2006/0163438 A1 | * | 7/2006 | Wojotowicz | A47B 87/0215 248/300 |
| 2010/0200324 A1 | * | 8/2010 | Melvin | B62D 21/02 180/312 |
| 2012/0285764 A1 | * | 11/2012 | Compton | B62D 21/02 180/312 |

(Continued)

Primary Examiner — Terrell L McKinnon
Assistant Examiner — Michael McDuffie
(74) Attorney, Agent, or Firm — Lightbulb IP, LLC (57) ABSTRACT

A modular transmission support secures a variety of transmissions to various vehicle frames. The modular transmission support comprises a crossmember that provides user-selectable positioning and attachment of vehicle transmissions. The crossmember comprises one or more trusses and a mounting pad or a set of mounting pads that may be secured at various positions at a concave section of the crossmember's trusses. One or more truss supports secure the crossmember to a vehicle at one or more pre-defined locations.

10 Claims, 7 Drawing Sheets

(56) References Cited

U.S. PATENT DOCUMENTS

| | | | |
|---|---|---|---|
| 2015/0066235 A1* | 3/2015 | Lee | G10K 11/16 701/1 |
| 2015/0107932 A1* | 4/2015 | Gabbianelli | B62D 21/11 180/312 |
| 2015/0360726 A1* | 12/2015 | Yuge | B62D 21/11 180/312 |

* cited by examiner

MODULAR TRANSMISSION SUPPORT

CROSS-REFERENCE TO RELATED APPLICATION

The application is a continuation-in-part of U.S. patent application Ser. No. 14/861,357, filed Sep. 22, 2015, which claims priority to U.S. Provisional Patent Application No. 62/055,449, filed Sep. 25, 2014.

BACKGROUND OF THE INVENTION

Field of the Invention

The invention relates to vehicle transmission supports and in particular to a modular transmission support.

Related Art

One common vehicle maintenance or restoration activity is to replace a vehicle's transmission. This can occur for a variety of reasons, including to repair, maintain, or upgrade a transmission, especially in older vehicles. There are a variety of transmissions that can be mated to any particular drive train. However, improper mounting of a transmission can cause increased noise and vibration and also damage drive train components.

From the discussion that follows, it will become apparent that the present invention addresses the deficiencies associated with the prior art while providing numerous additional advantages and benefits not contemplated or possible with prior art constructions.

SUMMARY OF THE INVENTION

A modular transmission support is disclosed herein. The modular transmission support allows a variety of transmissions to be secured to various vehicle frames without the need for custom fabrication or time-consuming modification of existing transmission mounts. Various elements of the modular transmission support permit user-selectable positioning of a transmission to ensure proper mounting of a transmission. The modular transmission support allows a transmission's position to be adjusted along multiple axes before the transmission is secured to a vehicle frame.

Various embodiments of a modular transmission support are disclosed herein. For instance, in one exemplary embodiment, a modular transmission support comprises a first truss having a concave portion, a second truss having a concave portion, one or more mounting pads between the first truss to the second truss at the concave portion of the first truss and the second truss, and one or more truss supports between the first truss and the second truss. The mounting pads have one or more slots formed therein. The truss supports comprise a body that extends laterally between the first truss and the second truss.

The body of the truss supports may extend outward to form an outwardly extending projection. Alternatively or in addition, the truss supports may comprise an outwardly extending projection. One or more frame mounting brackets may be at each end of the first truss and the second truss.

In another exemplary embodiment, a modular transmission support comprises a first truss having a concave portion, a second truss having a concave portion, and one or more truss supports laterally between the first truss and the second truss. The truss supports join the first truss and the second truss.

Similar to above, the truss supports may comprise an outwardly extending projection. In addition, one or more mounting pads may be between the first truss and the second truss at the concave section of the first truss and the second truss.

Various methods are disclosed herein as well. For instance, in one embodiment, a method for providing a modular transmission support is disclosed, with such method comprising providing a plurality of trusses comprising a concave portion, providing one or more mounting pads that join the plurality of trusses at the concave portion, and providing one or more truss supports that extend laterally between the plurality of trusses. The truss supports include an outwardly extending protrusion. The method may also include providing one or more frame mounting brackets, forming one or more slots in the mounting pads, or both.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The modular transmission support herein comprises a number of modules that allow a wide variety of transmissions to be properly and securely mounted to a wide variety of vehicles. Typically, the modular transmission support will eliminate the need to custom transmission mount fabrication, which is both time consuming and expensive. Where custom fabrication is needed, the modularity of the modular transmission support limits the amount of custom fabrication required because only individual modules will typically need to be custom fabricated in these situations.

Proper mounting includes securing a transmission at a location that provides a recommended or desired pinion angle for a particular drive train. The modular transmission support allows a transmission to be repositioned in its current vehicle, such as to compensate for settling of the vehicle.

The modular transmission support will typically comprise a crossmember and separate modular elements that attach the crossmember to a vehicle's frame at a desired location along a front to rear axis of a vehicle, and that raise or lower the position of a transmission supported by the crossmember. In this manner, the modular transmission support can be used to quickly and easily secure a transmission at a recommended or desired position.

Figure 1A:
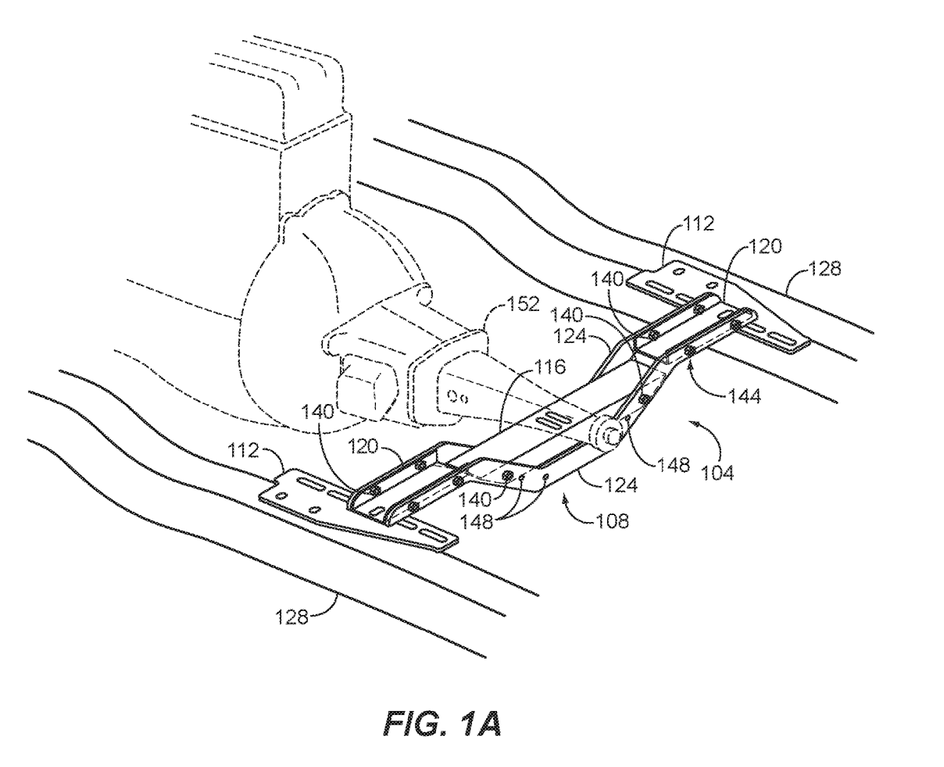
FIG. 1A is a front perspective view of an exemplary modular transmission support.

FIG. 1A is a front perspective view of an exemplary modular transmission support 104. As can be seen, a modular transmission support 104 may comprise various modular elements, namely, a crossmember 108, one or more sets of frame mounting brackets 112, one or more mounting pads 116, one or more sets of truss supports 120, or various combinations or subsets thereof.

As will be described further below, each set of frame mounting brackets 112 secure a crossmember 104 to a vehicle's frame 128 at a desired location along a front-rear axis of the vehicle while a mounting pad 116 holds a transmission 152 at a desired elevation or height. A crossmember may include a set of truss supports 120 used to attach the crossmember 108 its frame mounting brackets 112. A crossmember 108 provides a structure that supports the weight of a transmission 152 and will typically extend between portions of the vehicle's frame 128 when installed. As will be described further below, the span of a crossmember 108 may be increased or decreased by varying the mounting position of its truss supports 120. This allows a crossmember 108 to be mounted to vehicle frames 128 of various widths.

Figure 1B:
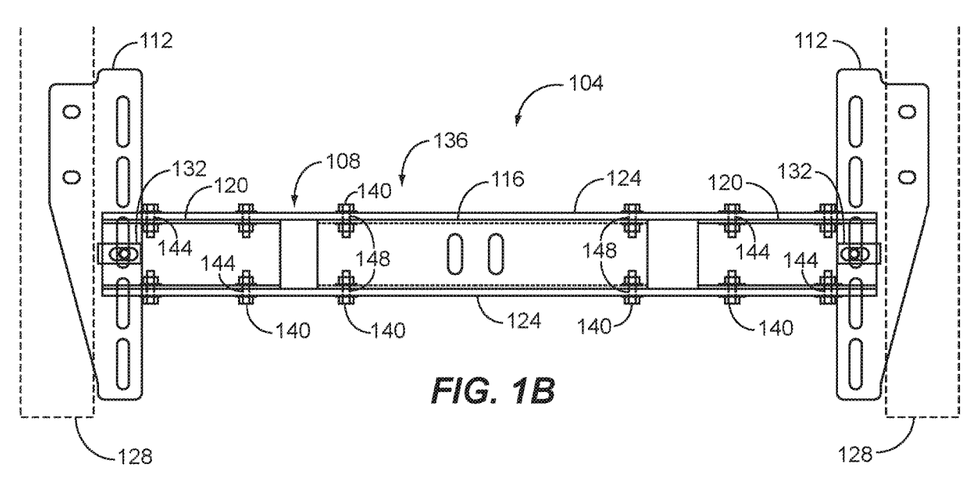
FIG. 1B is a top view of an exemplary modular transmission support.
Figure 1C:
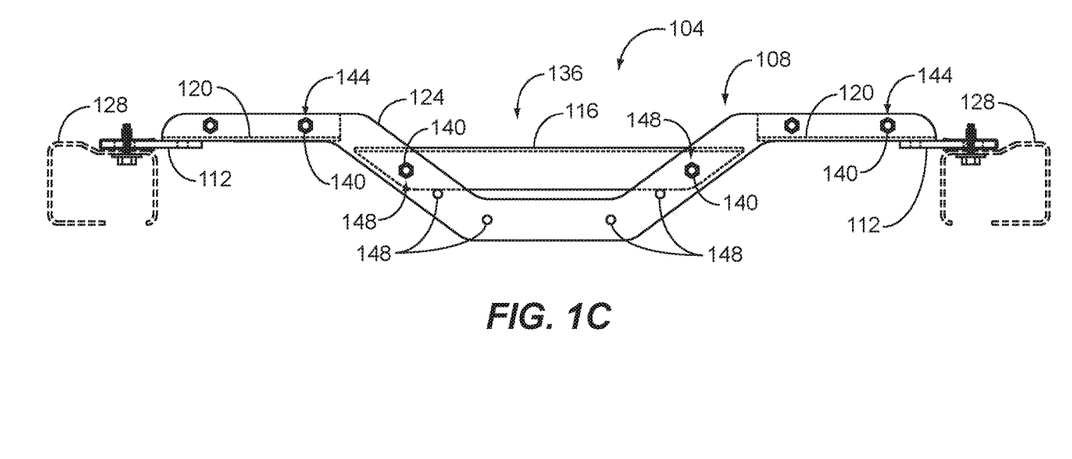
FIG. 1C is a front view of an exemplary modular transmission support.

Referring to FIGS. 1B-1C, which respectively illustrate a top and side view of a modular transmission support 104, it can be seen that a crossmember 108 may comprise one or more members or trusses 124. In one or more embodiments, each truss 124 may be the same size and shape for a particular crossmember 108. As can be seen in FIG. 1C, the trusses 124 may comprise an elongated structure having one or more concave sections 136 to receive a transmission and mounting pad 116 therefor. Each truss 124 may comprise a planar structure oriented perpendicularly to bending or deflection forces, such as those caused by movement or the weight of a transmission. A truss 124 provides rigidity to the crossmember 108 in this manner.

The trusses 124 of a crossmember 108 may be connected to one another in various ways. For instance, each truss 124 may be connected via a connecting structure extending between the trusses 124, such as the set of truss supports 120 shown in FIGS. 1B-1C. Due to the modular nature of the modular transmission support 104, the truss supports 120 will typically be removably attached, such as via one or more removable fasteners 140. In FIGS. 1A-1E, the removable fasteners 140 have been illustrated as bolts. Other exemplary removable fasteners include clamps, screws, rivets, and pins. A truss 124 may comprise one or more holes 144 or other mounting structures for receiving one or more removable fasteners 140 or other fasteners. It is contemplated that a mounting pad 116 may also or alternatively be used as a crossmember's connecting structure (as can be seen in FIG. 2B).

It is contemplated that one or more of a crossmember's truss supports 120 may be used to extend the span of a crossmember, as necessitated by a vehicle's frame 128. This may be accomplished by securing a truss support 120 such that it protrudes or extends beyond the end of its associated trusses 124. In one or more embodiments, a truss support 120 may be aligned with one or more holes 144 in a truss 124 to allow for such protrusion. A plurality of holes 144 or one or more elongated holes may be provided to permit a truss support 120 to protrude to various distances beyond the end of a truss 124. Alternatively or in addition, because the modular transmission support 104 is modular, it is contemplated that a number of truss supports 120 of varying lengths may be provided to achieve various crossmember spans.

Though it would reduce some of the modularity of the modular transmission support 104, it is noted that in some embodiments, one or more truss supports 120 may be permanently attached to their corresponding trusses 124, such as by one or more welds, adhesives or both.

Figure 1D:
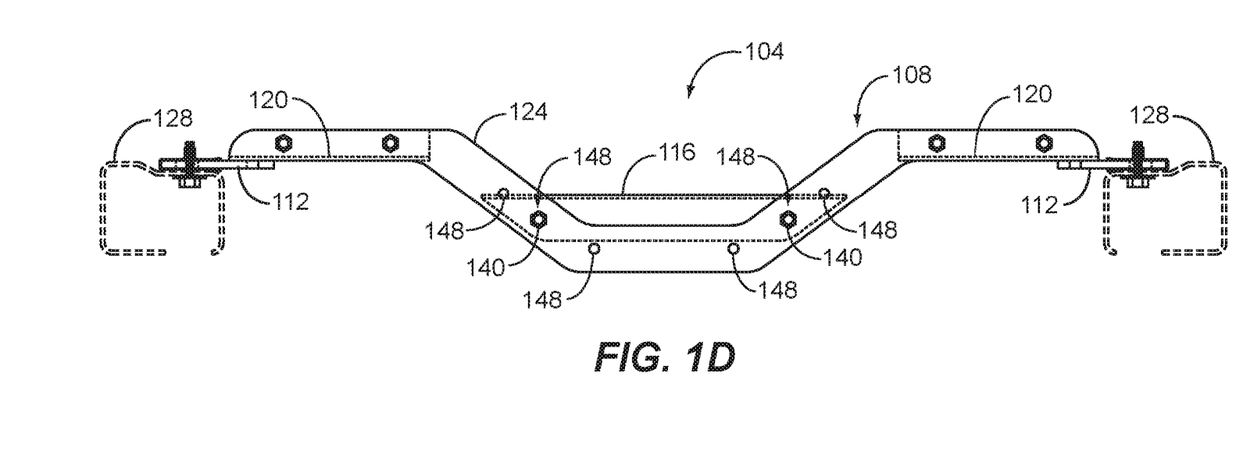
FIG. 1D is a front view of an exemplary modular transmission support.
Figure 1E:
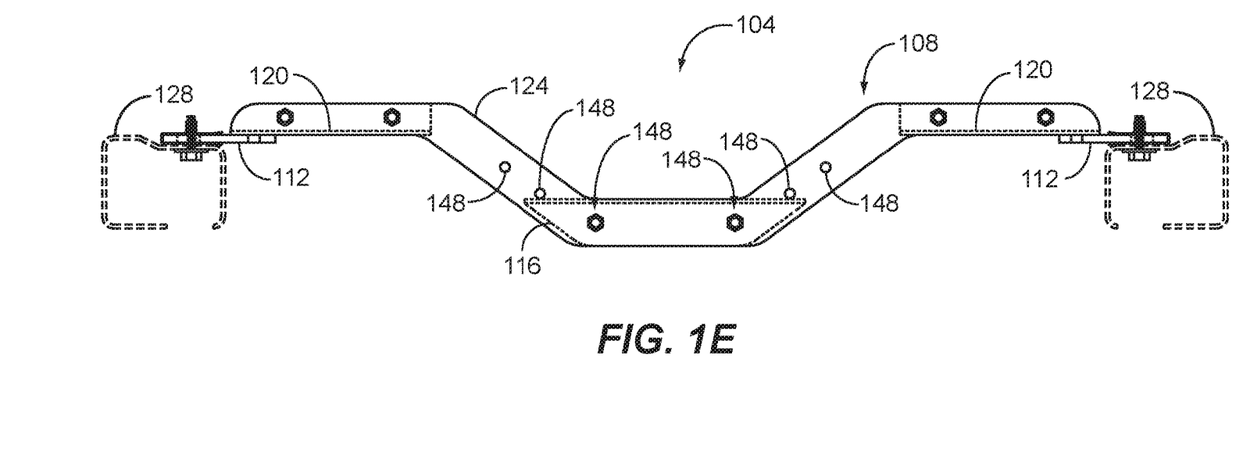
FIG. 1E is a front view of an exemplary modular transmission support.

A crossmember 108 will typically have a concave section 136 (defined by the shape of its one or more trusses 124) where one or more mounting pads 116 may be received and secured at various locations, as can be seen from the side views of FIGS. 1C-1E. A concave section permits a transmission to be mounted at various selectable locations. For instance, in one or more embodiments, a set of mounting pads 116 of different sizes, shapes, or both may be provided for attachment at different locations of a concave section 136 of a crossmember 108.

To illustrate, the mounting pad 116 of FIG. 1C has an increased width versus those of FIGS. 1D-1E so that it may be secured at a higher elevation at a tapered concave section 136 of a crossmember 108. Likewise, the mounting pads 116 of FIGS. 1D-1E are respectively sized in width to be secured at their associated elevations at a tapered concave section 136. In the embodiments of FIGS. 1C-1D, the mounting pads 116 are secured by removable fasteners 140, which pass through corresponding holes 148 in the crossmember 108 and mounting pad 116 to secure these elements to one another.

The holes 148 may define the location at which a particular mounting pad 116 should be secured. For instance, alignment of the holes 148 to those of a mounting pad 116 may indicate a proper location at which a mounting pad should be secured. It is contemplated that a mounting pad 116 may also or alternatively be attached to a crossmember 108 via one or more hooks, clamps, screws, pins or other removable fasteners. In addition, one or more detents and corresponding tabs may be provided to help align a mounting pad 116 relative to its crossmember 108 during installation.

It is noted that a set of different mounting pads 116 need not be included in every embodiment. For example, a single mounting pad 116 may have holes or other mounting structures that accommodate installation at various locations of a crossmember's concave section 136. For example, a mounting pad 116 may have multiple sets of holes corresponding to holes of each elevation provided at a concave section 136 of a crossmember 108.

Alternatively, it is contemplated that a concave section 136 need not be tapered and thus may have parallel sides. In such embodiments, a single mounting pad 116 may be installed at various elevations. In any case, a plurality of different mounting pads 116 may always be provided though, such as mounting pads 116 of various heights to permit additional flexibility in achieving a desired elevation at which to mount a transmission.

Figure 2A:
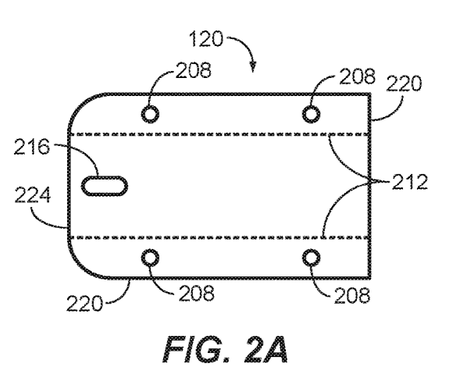
FIG. 2A is a top view of an exemplary truss support.
Figure 2B:
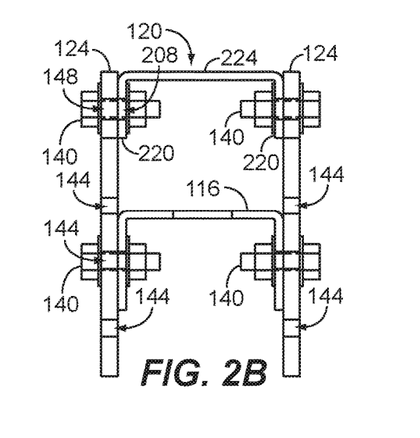
FIG. 2B is a side view of an exemplary modular transmission support.

FIG. 2A illustrates a top view of an exemplary truss support 120 and the elements thereof. As can be seen, a truss support 120 may comprise a body 224 and one or more flanges 220. The flanges 220 will typically be folded along fold lines 212 to be perpendicular to the body 224. This allows trusses 124 of a crossmember to be parallel to one another when secured to one another via a truss support 120, as can be seen in the side view of FIG. 2B. The folding of the flanges 220 also enhances the rigidity of a truss support 120.

Each flange 220 may comprise one or more holes 208 to secure the flange to a crossmember truss 124. Referring back to FIG. 2B for instance, it can be seen that holes 208 of a flange 220 correspond to holes 148 of a crossmember truss 124 where truss supports 120 are installed. As described above, a removable fastener 140, such as a bolt (and corresponding nut), screw or pin, will typically be used to allow a truss support 120 to be removed, replaced or both. This is advantageous in that various sets of truss supports 120 may be attached to accommodate different vehicle frames 128, transmissions or both.

One or more bracket mounting slots 216 may be formed in the body 224 of a truss support 120 as well, such as at a distal end of a truss support. A bracket mounting slot 216 receives a fastener, such as a bolt or screw, to attach a truss support 120 to a frame mounting bracket 112, as can be seen from FIGS. 1B-1C. As can be seen, a bracket mounting slot 216 will typically be elongated along a proximal-distal axis of a truss support 120. This allows a cross member 108 to be adjusted to a desired position along a proximal-distal axis before it is secured to a frame mounting bracket 112. For example, a bracket mounting slot 216 may be elongated to permit 0.75 in movement to allow a desired position to be achieved before it is secured.

As will be described further below, a frame mounting bracket 112 will also typically allow for position adjustment along a perpendicular or other axis to the proximal-distal axis. This is advantageous in permitting a desired transmission mounting position to be established along multiple axes regardless of the particular characteristics of the transmission or a vehicle's frame 128.

Figure 3A:
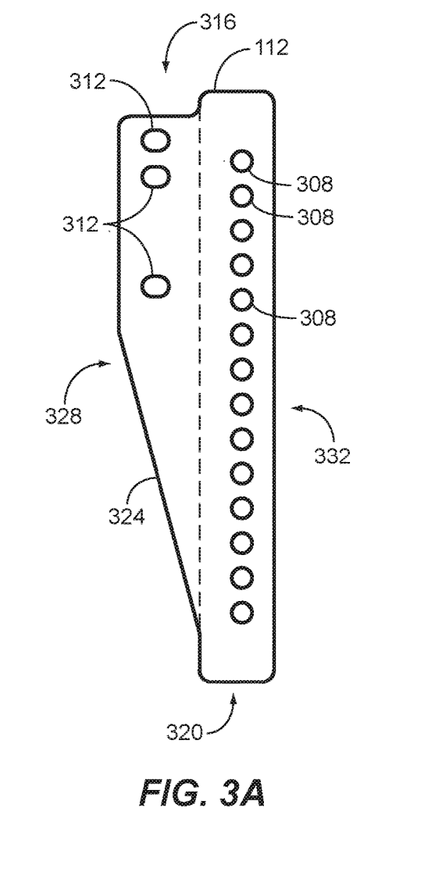
FIG. 3A is a top view of an exemplary frame mounting bracket.
Figure 3B:
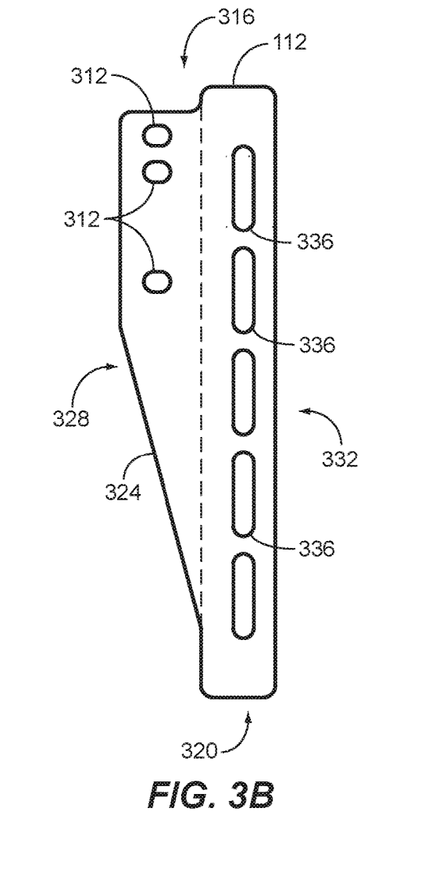
FIG. 3B is a top view of an exemplary frame mounting bracket.

FIGS. 3A-3B illustrate top views of exemplary frame mounting brackets 112 and elements thereof. As can be seen, a frame mounting bracket 112 may have one or more sections 328, 332, such as delineated by the dashed line of FIGS. 3A-3B. A frame attachment section 328 may comprise one or more frame attachment holes 312 for attaching the frame mounting bracket 112 to a vehicle frame, while a crossmember attachment section 332 comprises a series of crossmember attachment holes 308 or one or more crossmember attachment slots 336 for attaching a crossmember. The embodiment of FIG. 3A illustrates crossmember attachment holes 308, while the embodiment of FIG. 3B illustrates crossmember attachment slots 336. As can be seen, crossmember attachment slots 336 are elongated as compared to crossmember attachment holes 308.

Typically, the frame attachment holes 312 will correspond to the location of threaded or other holes in a vehicle frame to allow a fastener 140 to attach a frame mounting bracket 112 to the vehicle frame 128, such as shown in FIGS. 1B-1E. It is noted that the frame attachment holes 312 may be elongated or enlarged to allow for some adjustment before a frame mounting bracket 112 is secured to a vehicle frame 128. For example, a frame attachment hole 312 may be elongated or enlarged to permit 0.25 in movement of a frame mounting bracket 112 before it is secured.

A plurality of crossmember attachment holes 308, crossmember attachment slots 336, or various subsets/combinations thereof will typically be formed along a linear or other path from the front end 320 to the back end 316 of a frame mounting bracket 112. This allows a user to select one or more crossmember attachment holes 308 or crossmember attachment slots 336 at which to attach a crossmember. In this manner, a desired position for the crossmember can be selected along the front-rear axis of a vehicle's frame.

As can be seen from the exemplary installation of FIG. 1B, a central crossmember attachment slot 336 has been selected thereby positioning the illustrated crossmember 108 at a central position relative to the frame mounting brackets 112. Relative to FIGS. 3A-3B, it can now be seen that selection of one or more different crossmember mounting holes 308 or crossmember mounting slots 332 will change the position of a crossmember 108 along a front-rear axis. In addition, where a set of frame mounting brackets 112 having crossmember mounting slots 332 is used, position adjustment within each crossmember mounting slot is available as well as compared to a more discrete mounting position provided by a crossmember mounting hole 308.

A frame mounting bracket 112 may taper towards or at its front end 320 in one or more embodiments. The frame mounting brackets 112 shown in FIGS. 3A-3B illustrate an exemplary taper 324 for instance. A taper 324 helps prevent a frame mounting bracket 112 from becoming an obstruction or being blocked from installation by a vehicle component. In one or more embodiments, the taper 324 may be formed in a frame attachment section 328, a crossmember attachment section 332 or both.

Figure 4A:
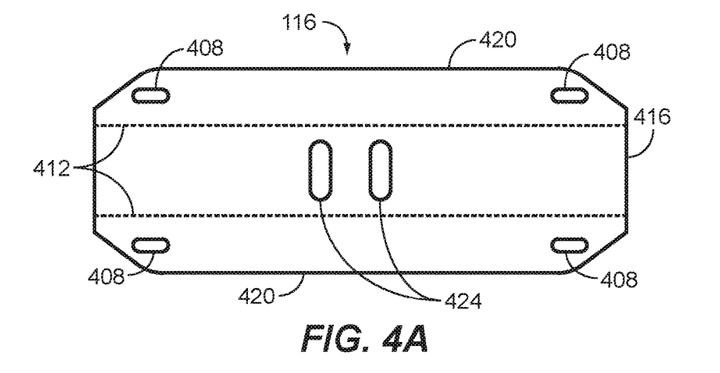
FIG. 4A is a top view of an exemplary mounting pad.
Figure 4B:
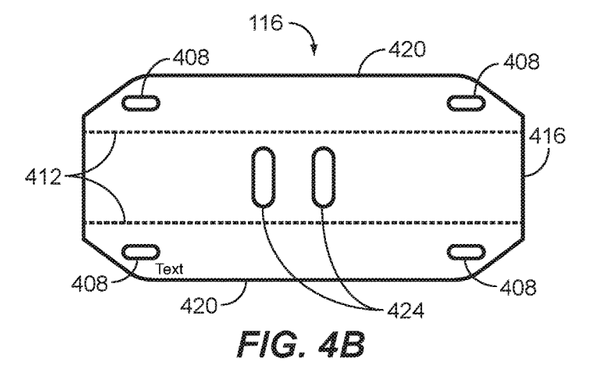
FIG. 4B is a top view of an exemplary mounting pad.
Figure 4C:
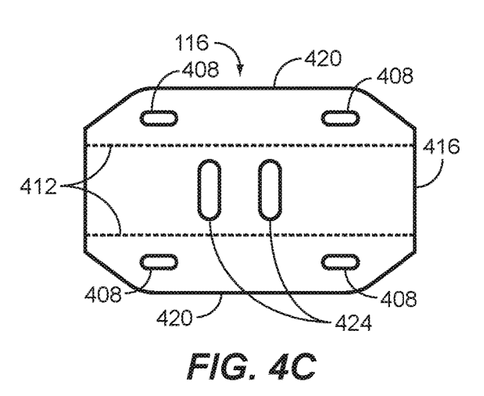
FIG. 4C is a top view of an exemplary mounting pad.

FIGS. 4A-4C illustrate top views of exemplary mounting pads 116 to which a vehicle transmission may be mounted. As can be seen, a mounting pad 116 may comprise a body 416 and one or more flanges 420. A flange 420 will typically be perpendicular to its body 416, such as can be seen in the side view of FIG. 4D. Flanges 420 of a mounting pad 116 may be folded along fold lines 412 to arrive at a perpendicular position. The perpendicular position of a flange 420 helps increase the rigidity of the mounting pad 116.

One or more crossmember mounting slots 408 may be in a flange 420. For instance, as shown in FIGS. 4A-4C, crossmember mounting slots 408 are located at the lateral ends of each flange 420. Crossmember mounting slots 408 may be elongated in a lateral direction or in a direction perpendicular or at another angle thereto to permit adjustability before a mounting pad is secured. For example, a crossmember mounting slot 408 may be elongated to permit 0.5 in of movement before its mounting pad is secured.

Figure 4D:
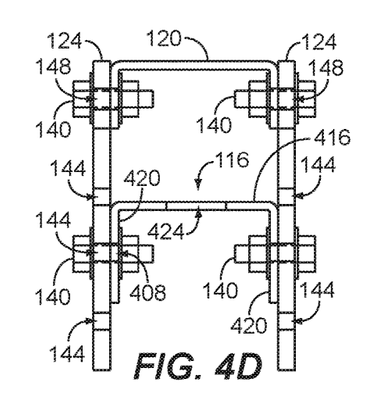
FIG. 4D is a side view of an exemplary modular transmission support.

In use, a crossmember mounting slot 408 will receive a fastener 140 to secure the mounting pad 116 to a crossmember's truss 124, such as shown in FIG. 4D. The elongated shape of a crossmember mounting slot 408 allows for some movement or adjustment along its elongated axis before a mounting pad 116 is secured to its trusses 124.

A body 416 of a mounting pad 116 will typically comprise one or more transmission mounting slots 424 for mounting a transmission to the mounting pad. For instance, one or more fasteners may pass through one or more transmission mounting slots 424 to engage and secure a transmission to a mounting pad 116. It is noted that in some situations, an additional mount or pad may be positioned between a transmission and the mounting pad 116 before the transmission is secured to the mounting pad. The one or more transmission mounting slots 424 may be centered or centrally positioned relative to the body, with or without an offset. The transmission mounting slots 424 of FIGS. 4A-4C are shown slightly offset (to the left) from center for example.

The offset position of one or more transmission mounting slots 424 is advantageous for a number of reasons. First, the offset allows proper positioning of a transmission at an angle within a vehicle's engine bay for modern vehicles. Also, in combination with the crossmember mounting slots 408, the offset position allows transmission mounting slots 424 to be centered if necessary for a particular vehicle's transmission. To illustrate, the width of a mounting pad's crossmember mounting slots 408 may be equal to the offset of the one or more transmission mounting slots 424. A mounting pad 116 formed in this manner can then slide rightward along its crossmember mounting slots 408 such that its transmission mounting slots 424 are centered. Alternatively, the same mounting pad 116 may provide offset transmission mounting slots 424 if moved leftward.

Moreover, the modular nature of a mounting pad 116 allows the same adjustment in positioning in the opposite direction. To illustrate, a mounting pad 116 may be rotated 180 degrees (relative to the positions shown in FIGS. 4A-4C). In this orientation, sliding the mounting pad 116 leftward along its crossmember mounting slots 408 would remove the offset of the transmission mounting slots 424 (thereby centering these mounting slots), while sliding the mounting pad 116 rightward would generate offsets of varying amounts.

As can therefore be seen, a mounting pad 116 can offer a range of transmission mounting slot positions between a left of center offset and a right of center offset, and including a centered position. This range can be defined by the width of the crossmember mounting slots 408. Typically, the offset of a mounting pad's transmission mounting slots 424 will be equal to the width of its crossmember mounting slots 408 to allow a centered position of the mounting slots 424, if desired, when the mounting pad installed on a crossmember. In one exemplary embodiment, the offset distance is 0.5 in from center.

A transmission mounting slot 424 will typically be oriented such that it extends perpendicular to the mounting pad 116 and crossmember. In this manner, the elongated shape of a transmission mounting slot 424 provides a multitude of positions at which a fastener can be positioned to engage and secure a transmission to a mounting pad 116. To illustrate, a transmission mounting slot 424 can receive a fastener at any point along its length to engage a threaded or other opening or mount of a transmission.

As described above, a modular transmission support may include a plurality of different mounting pads 116 to allow for mounting of a transmission at various positions. For example, FIGS. 4A-4C, if taken together, illustrate an exemplary set of different mounting pads 116, with the mounting pad of FIG. 4A being the largest followed by the mounting pad of FIG. 4B and then the mounting pad of FIG. 4C. More specifically, the mounting pad 116 of FIG. 4A is the widest followed by the narrower mounting pads of FIG. 4B and FIG. 4C.

Though only one mounting pad 116 may be selected for use, it is noted that the remainder may be retained for future use. Because the modular transmission support may be used with a variety of vehicle and transmission combinations, it is possible to remove the modular transmission support from one vehicle, reposition and/or swap one or more modules thereof, and then use the same modular transmission support in a different vehicle and transmission combination.

FIG. 4D illustrates an exemplary mounting pad 116 mounted at a middle position corresponding to that shown in FIG. 1D. As can be seen, one or more fasteners 140 secure the mounting pad 116 to a crossmember's trusses 124 in this position. FIG. 4D also illustrates additional pairs of laterally aligned holes 144 where a mounting pad 116 can be secured by one or more fasteners at a higher or lower elevation respectively corresponding to the mounting pad positions illustrated in FIG. 1C and FIG. 1E.

Figure 5A:
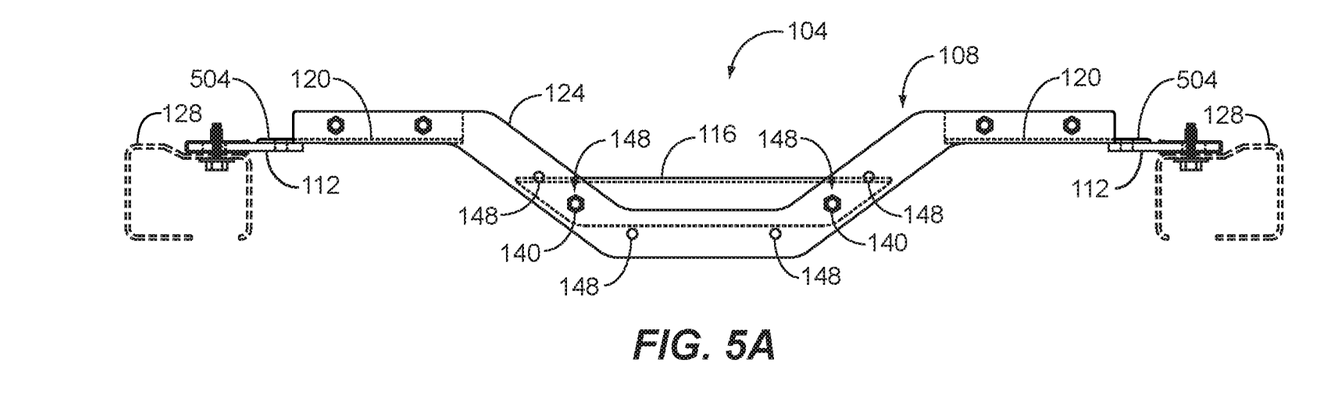
FIG. 5A is a front view of an exemplary modular transmission support.
Figure 5B:
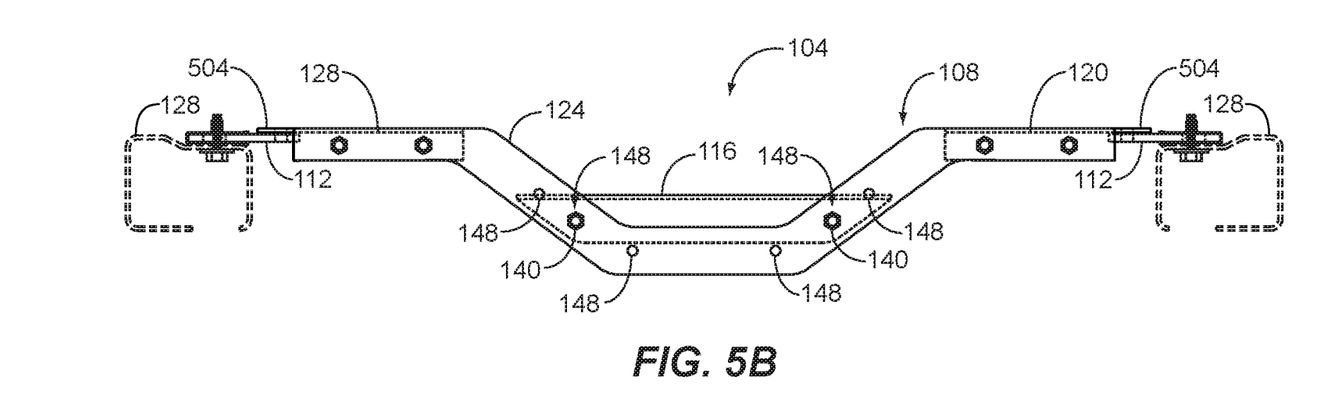
FIG. 5B is a front view of an exemplary modular transmission support.

FIGS. 5A-5B illustrate an exemplary modular transmission support 104 having truss supports 120 that may be inverted. Such truss supports 120 may be used to hold a modular transmission support 104 at a particular elevation. As can be seen, from FIGS. 5A-5B, a truss support 120 may have one or more projections 504 for engaging a frame mounting bracket 112 to mount a modular transmission support 104 to a vehicle's frame. A projection 504 may be an outwardly extending structure, such as a tab, tongue or similar supporting member, and may have one or more openings therein to receive a fastener, as will be described further below.

A projection 504 will also typically be located at an offset position. As shown for instance, the projection 504 extends from a bottom portion of the truss support 120. This offsets the location of the projection 504, which allows the projection to locate a modular transmission support 104 at different elevations. To illustrate, in FIG. 5A, the truss supports 120 have been installed in a first orientation while, in FIG. 5B, the truss supports have been installed in a second orientation that is inverted relative to the first orientation. As can be seen, in the first orientation, a first side of a projection 504 engages a frame mounting bracket 112. In the second orientation, a second side of the projection 504, opposite the first side, engages the frame mounting bracket 112.

The offset positioning of the projection 504 causes the modular transmission support 104 to be held at a distinct elevation depending on whether a truss support 120 is mounted in a first or second orientation (i.e., not inverted or inverted). As can be seen from the exemplary embodiments of FIGS. 5A-5B, a modular transmission support 104 may be at a higher or raised elevation when its truss supports 120 are in a first orientation, and at a lower elevation when its truss supports are in a second orientation.

Though illustrated as being secured to a vehicle's frame 128 via frame mounting brackets 112, it is contemplated that frame mounting brackets may be omitted in some embodiments as a projection 504 of a truss support 120 may directly engage and attach to a frame.

Figure 6A:
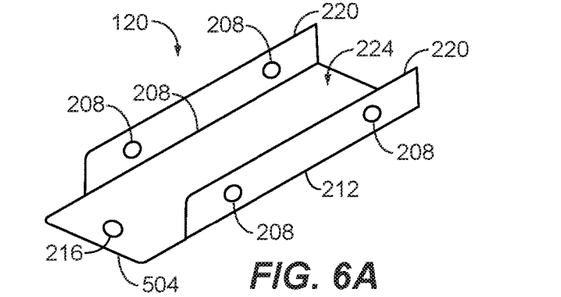
FIG. 6A is a top view of an exemplary truss support.
Figure 6B:
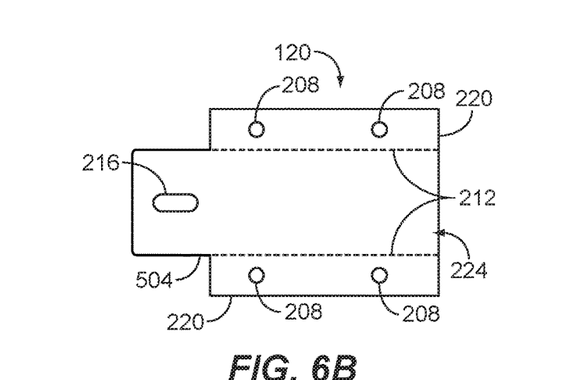
FIG. 6B is a perspective view of an exemplary truss support.

FIGS. 6A-6B illustrate exemplary truss supports 120 having a projection 504. As described above, a truss support 120 may comprise a body 224 and one or more flanges 220. A projection 504 may extend from or be part of the body 224 such as shown. It is contemplated that a projection 504 may extend from one or more flanges 220, the body 224 or both in the various embodiments of the modular transmission support.

A projection 504 will typically also comprise one or more bracket mounting slots 216, such as those described above. A bracket mounting slot 216 receives one or more fasteners to attach a truss support 120 to a frame mounting bracket or a vehicle's frame. Though not required in all embodiments, the elongated shape of a bracket mounting slot 216 permits the position of a truss support 120 (and therefore the position of the modular transmission support) to be adjusted.

A projection 504 may be formed in various ways. For example, a projection 504 may be attached to a body 224 of a truss support, such as by one or more welds, bonds, fasteners or the like. Alternatively, a projection 504 may be part of a body 224, such as shown in FIG. 6A. The flanges 220 of a truss support 120 may be shortened to form a projection 504 in one or more embodiments.

Referring to FIG. 6B, it can be seen that, in one or more embodiments, the components of a truss support 120 may be formed from a single piece of material. For example, a portion of a truss support may be folded, such as along fold lines 212, to form one or more truss supports 120. The flanges 220 enhance the rigidity of a truss support 120 and provide a structure that may be used to mount a truss support to trusses 124 of a crossmember 108, such as shown in the side view of FIG. 6C.

Figure 6C:
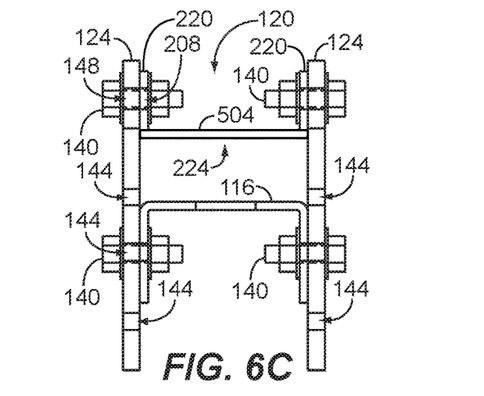
FIG. 6C is a side view of an exemplary modular transmission support.

In FIG. 6C, a truss support 120 is illustrated in an upright orientation like that of FIG. 5A. As can be seen, a projection 504 of the truss support 120 is at the bottom of the truss support in this orientation. One or more holes 208 of the flanges 220 correspond to holes 148 of the trusses 124 to receive a fastener 140 that secures the truss support 120 to the trusses. It is contemplated that one or more holes 208 in a flange 220 may be located such that they correspond to one or more holes 148 of one or more trusses 124, regardless of whether a truss support 120 is in an upright or inverted orientation.

As can be seen, the modular transmission support herein is compatible with a wide variety of vehicle and transmission combinations by virtue of its modularity. In addition, the holes and slots in the modular transmission support may be elongated or enlarged to permit adjustability to achieve a desired for modules of the modular transmission support, which results in a desired positioning of a vehicle transmission. It is contemplated that one or more mating surfaces of the modular transmission support's modules may be textured so as to prevent them from moving relative to one another once secured to one another. In some embodiments, one or more adhesives, welds or the like may be applied to further secure modules of a modular transmission support once such modules are positioned as desired.

It is contemplated that in some embodiments, an end-user may fabricate their own holes or slots as desired. In addition, in some embodiments, markings, detents or other indicator may be provided to suggest or guide positioning of end-user fabricated holes or slots. These indicators will typically be positioned so as to not weaken the structure of a module if a hole or slot should be fabricated at its position.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A modular transmission support comprising:
    a first truss having a concave portion;
    a second truss having a concave portion;
    one or more mounting pads between the first truss to the second truss at the concave portion of the first truss and the second truss, the one or more mounting pads having one or more slots formed therein; and
    one or more truss supports between the first truss and the second truss, the one or more truss supports comprising a body that extends laterally between the first truss and the second truss and one or more flanges extending substantially perpendicular to the body;
    wherein the one or more truss supports extend outward from the first truss and the second truss substantially horizontally and are reversably mountable thereto via the one or more flanges to attach to a vehicle frame or a frame mounting bracket via a first portion of the one or more truss supports and, when reversed, via a second portion of the one or more truss supports.

2. The modular transmission support of claim 1, wherein the first portion comprises an outwardly extending projection of the body of the one or more truss supports.

3. The modular transmission support of claim 1, wherein the first portion comprises an outwardly extending projection of the one or more truss supports.

4. The modular transmission support of claim 1 further comprising one or more frame mounting brackets at each end of the first truss and the second truss.

5. A modular transmission support comprising: a first truss having a concave portion; a second truss having a concave portion; and one or more truss supports laterally between the first truss and the second truss, wherein the one or more truss supports join the first truss and the second truss; wherein the one or more truss supports extend outward from the first truss and the second truss substantially horizontally and are reversably mountable thereto to attach to a vehicle frame or a frame mounting bracket via a first portion of the one or more truss supports and, when reversed, via a second portion of the one or more truss supports.

6. The modular transmission support of claim 5, wherein the one or more truss supports first portion comprises an outwardly extending projection of the one or more truss supports.

7. The modular transmission support of claim 5 further comprising one or more mounting pads between the first truss and the second truss at the concave section of the first truss and the second truss.

8. A method for providing a modular transmission support comprising:
    providing a plurality of trusses comprising a concave portion;
        providing one or more mounting pads that join the plurality of trusses at the concave portion; and
        providing one or more truss supports that extend laterally between the plurality of trusses, wherein the one or more truss supports include an outwardly extending protrusion and one or more flanges substantially perpendicular to the outwardly extending protrusion;
        wherein the one or more truss supports extend outward from the first truss and the second truss substantially horizontally and are reversably mountable thereto to attach to a vehicle frame or a frame mounting bracket via a first portion of the one or more truss supports and, when reversed, via a second portion of the one or more truss supports.

9. The method of claim 8 further comprising providing one or more frame mounting brackets.

10. The method of claim 8 further comprising forming one or more slots in the one or more mounting pads.

\* \* \* \* \*